United States Patent [19]
Kullmann et al.

[11] Patent Number: 5,425,296
[45] Date of Patent: Jun. 20, 1995

[54] SAW BLADE

[75] Inventors: Jörg H. Kullmann; Manfred Fluhrer, both of Spangenberg, Germany

[73] Assignee: Wilhelm H. Kullman Wikus Sagenfabrik, Spangenberg, Germany

[21] Appl. No.: 265,515

[22] Filed: Jun. 24, 1994

Related U.S. Application Data

[63] Continuation of Ser. No. 3,517, Jan. 12, 1993, abandoned.

[51] Int. Cl.⁶ .................. B23D 61/02; B23D 61/12
[52] U.S. Cl. ........................... 83/846; 83/847; 83/676
[58] Field of Search ............... 83/661, 846, 847, 848, 83/849, 850, 676

[56] References Cited

U.S. PATENT DOCUMENTS

| | | | |
|---|---|---|---|
| 4,011,783 | 3/1977 | Mobley | 83/851 |
| 4,133,240 | 1/1979 | Vollmer et al. | 83/848 |
| 4,557,172 | 12/1985 | Yoneda | 83/848 |
| 4,727,788 | 3/1988 | Yoshida et al. | 83/848 |

FOREIGN PATENT DOCUMENTS 0266022  5/1988  European Pat. Off. ......... 83/846

Primary Examiner—Rinaldi I. Rada
Attorney, Agent, or Firm—George M. Thomas; Hopkins & Thomas

[57] ABSTRACT

A saw blade having a basic body (1) and unset teeth ($2_1$, $2_2$, etc.) having recurring cycles of teeth, each cycle having at least one group of teeth with at least three teeth, and where tooth height decreases from tooth to tooth while tooth width simultaneously increases. The teeth ($2_1$, $2_2$, etc.) are formed symmetrically with respect to a longitudinal center plane (8) extending through the basic body (1). The effective cutting edges or cutting-edge sections ($6_1$, $12_1$, $14_2$, $12_2$, etc.) of each tooth ($2_1$, $2_2$, etc.) are formed by a jutting-out or protruding cutting edge, the inner section ($6_1$, $6_2$, etc.) of which runs approximately perpendicularly with respect to the longitudinal center plane (8) and which is adjoined externally by a phase ($7_1$, $7_2$, etc.) inclined toward the basic body (1) The widest tooth (2) in the group of teeth has an angle greater than 90 degrees formed between phase (7) and flank (10).

13 Claims, 4 Drawing Sheets

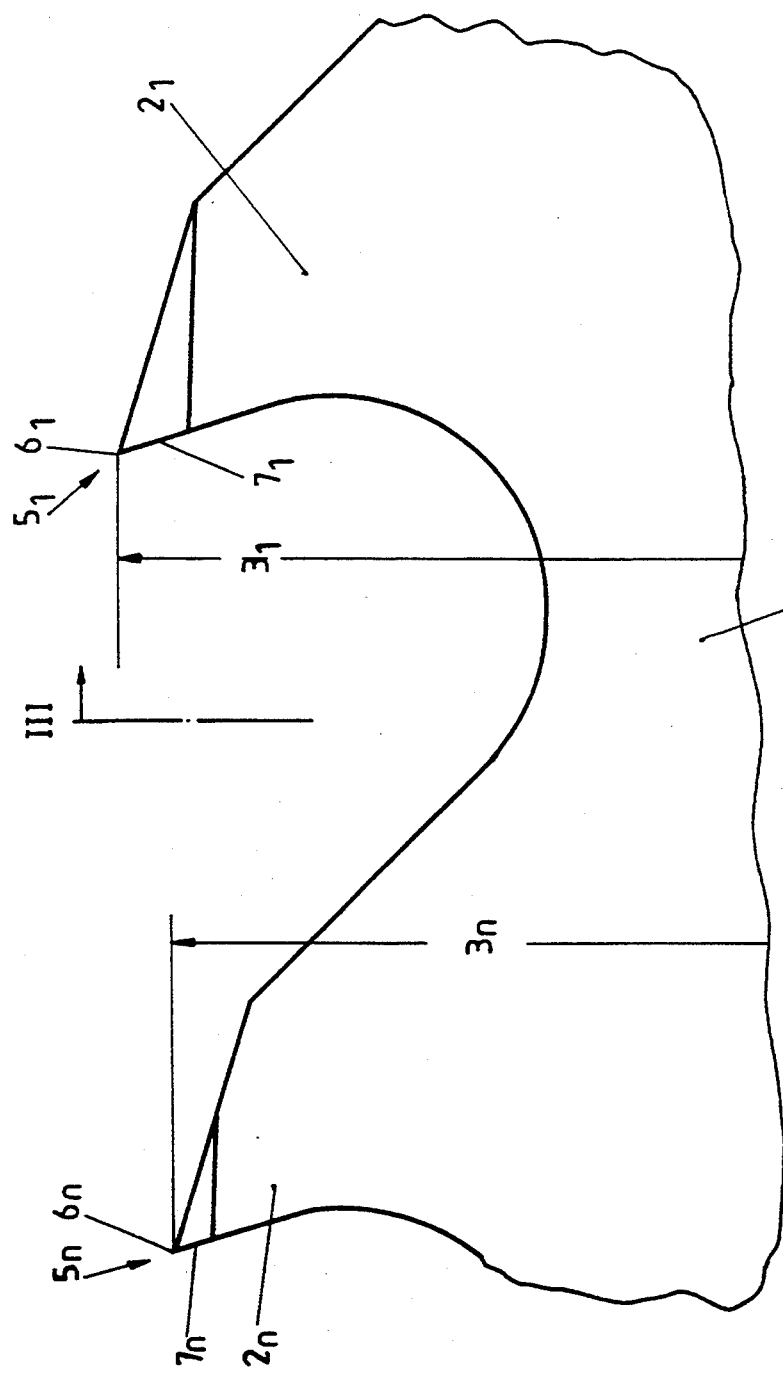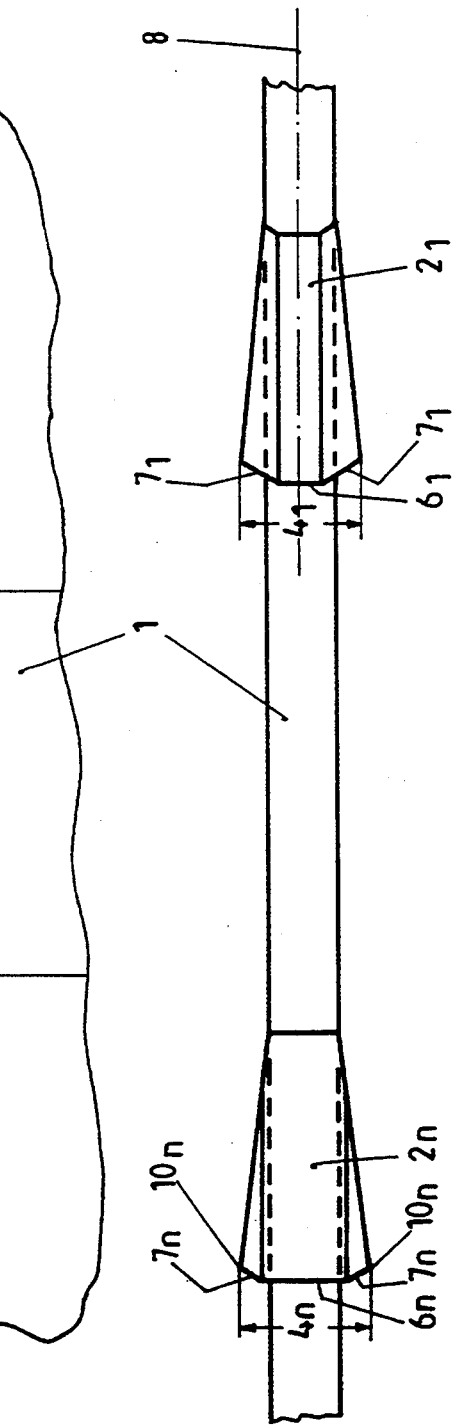

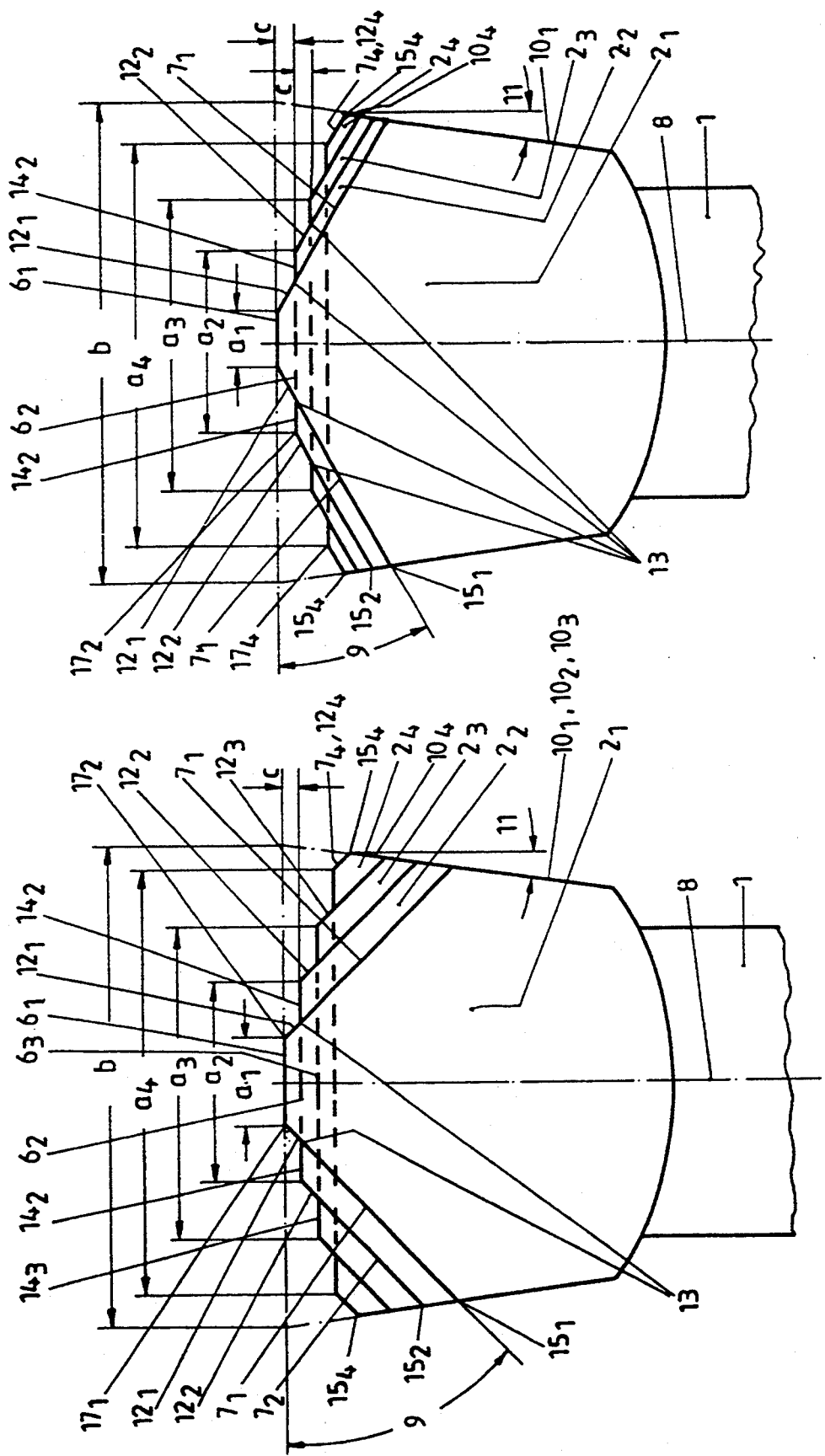

SAW BLADE

This is a continuation of application Ser. No. 08/003,517 filed on Jan. 12, 1993, now abandoned.

FIELD OF THE INVENTION

The invention relates to a saw blade having a basic body and unset teeth with cutting edges which are provided in recurring cycles, and each cycle has at least one group of teeth with a height decreasing from tooth to tooth and width at the same time increasing, the teeth being formed symmetrically with respect to a longitudinal center plane through the basic body. The invention can be applied both in the case of a band saw blade, that is a saw blade with linear arrangement of the teeth one behind the other, and in the case of a circular saw blade.

BACKGROUND OF THE INVENTION

German Offenlegungsschrift 3,611,063 discloses a saw blade with teeth which are provided in recurring cycles. Each cycle thereby forms at the same time a group of teeth, so that the number of teeth per cycle coincides with the number of teeth per group. The teeth in the group or in the cycle are differentiated with regard to a leading tooth, that is the first tooth, in a cycle or group and with regard to following teeth. The leading tooth in this case has the greatest height and the tooth height decreases in the group. The following teeth are formed as set teeth and are generally provided alternately set to left and right, in order in this way to make the width of the cut channel greater than the width of the basic body of the saw blade. Instead of only one unset leading tooth, two unset leading teeth may also be provided in front of the set following teeth, it being possible to form the first leading tooth externally with two phases and to this extent make it symmetrical with respect to a longitudinal center plane of the basic body. In conjunction with a height offset, the two leading teeth are in this way shaped similarly to the known roughing tooth and finishing tooth of a circular saw blade and the effective cutting edge of the one leading tooth is in this case divided in the known way between two leading teeth. The width of the two leading teeth in this case coincides with the width of the basic body. Consequently, necessarily set following teeth are provided thereafter in the group or in the cycle. In a further group of teeth, three unset leading teeth and two set following teeth are combined, the effective cutting edges or cutting-edge sections of the leading teeth being divided by phases on the first and second leading teeth between the three leading teeth. The leading teeth are also graduated decreasingly in height, just like the adjoining set following teeth. All the leading teeth have a width which does not exceed the width of the basic body of the saw blade. Therefore, set following teeth are also always provided. However, in German Offenlegungsschrift 3,611,063 there is also described an illustrative embodiment in which no set teeth but only unset teeth are provided in the group of teeth or in the recurring cycle. The present invention is based on such a saw blade. A leading tooth is followed by two following teeth, giving a height decreasing from tooth to tooth and a width increasing from tooth to tooth in the group. All the teeth are formed symmetrically with respect to a longitudinal center plane through the basic body. The first tooth in the group of teeth has a cutting edge which is formed in a continuous straight line, this cutting edge extending perpendicularly with respect to the longitudinal center plane of the saw blade. This first tooth coincides in its width with the width of the basic body. The two following teeth likewise have cutting edges which are in a continuous straight line perpendicularly with respect to the longitudinal center plane but of which in each case only outer parts are effective. The following teeth have different flank angles and, although the enclosed angle between flank and cutting edge is different on the individual following teeth, it is always formed as an acute angle. The effective cutting edge increases in its length from tooth to tooth in the group, so that the major cutting work is to be performed by the leading tooth, and the two following teeth essentially effect only a widening of the cut channel in order that a clearance cut is achieved. This illustrative embodiment of a saw blade is intended to coincide in function and effect with the illustrative embodiments in which set teeth are used. Such a saw blade in which the teeth are formed symmetrically with respect to a longitudinal center plane through the basic body, only unset teeth being used, is extremely elaborate in production, it not being clear how the greater width of the following teeth, in comparison with the width of the basic body, is to be achieved in the first place. In addition, this embodiment with the unset teeth also has numerous other disadvantages. The effective part of the cutting edge on the following teeth in each case encloses an acute angle with the flank, that is an angle which is less than 90°, so that when cutting work is performed these lateral tooth tips are subjected to wear, by which the width of the cut channel decreases rapidly. This disadvantage does not occur to such a great extent on the set teeth, since here the angle between effective cutting edge and flank is approximately 90°. Set following teeth are always unfavorable for the straight running of a saw blade, because lateral forces occur on them, that is forces which, acting on one side, result in a deflection of the set tooth concerned. This has an effect not only with regard to a poorer surface quality on the cut face in the cut channel, but at the same time constitutes an excitation of vibrations for the saw blade. The unset leading tooth has no lateral clearance angle, so that it rubs in the guide channel in the region of its flanks. The leading tooth must perform the main cutting work and thereby clear the greatest cross section. This also applies to a plurality of leading teeth within a group of teeth; in all cases, the set teeth are loaded less. Due to the alternate arrangement of set teeth, there is the risk of the outer corners of the teeth set laterally to the right exhibiting different wear than the outer corners of the teeth set laterally to the left. This wear is the cause or the beginning of a tendency of the saw blade to run sideways.

Also known is a saw blade designed as a band saw blade, in which, to simulate a roughing tooth and finishing tooth on circular saw blades, the effective cutting edge is divided over the cut channel width between the roughing tooth and finishing tooth. The roughing tooth has a greater tooth height than the finishing tooth. The finishing tooth, however, has a greater tooth width than the roughing tooth. The effective parts, that is the cutting parts of the respectively provided tooth cutting edge, are formed on the roughing tooth and finishing tooth by a jutting-out cutting edge, there being provided externally in each case a phase which is inclined toward the basic body. The roughing tooth and finishing tooth in the group of teeth have an angle formed between the phase and the flank so as to be greater than 90°. Consequently, the finishing tooth is less sensitive to wear in the region of its corners between phase and flank, cutting the side wall of the cut channel, than in the case of an acute-angled configuration. However, this design is restricted to two teeth in the group as the roughing tooth and the finishing tooth and, by the small number of teeth in the group, is aimed at removing the thinnest possible chips during cutting.

SUMMARY OF THE INVENTION

The invention is based on the object of providing a saw blade of the type described at the beginning which, on the one hand, can be produced with reasonable expenditure and with which, on the other hand, stabilized straight running is obtained without the risk of the band running sideways.

According to the invention, this is achieved in the case of the saw blade of the type described at the beginning by the effective cutting edges or cutting-edge sections of all the teeth being in each case formed by a jutting-out cutting edge, the inner section of which runs approximately perpendicularly with respect to the longitudinal center plane and which is adjoined externally by a phase inclined toward the basic body, and by the widest tooth in the group of teeth having an angle greater than 90° between phase and flank. Consequently, on this saw blade there are no set teeth but only unset teeth, formed symmetrically with respect to the longitudinal center plane through the basic body. Although these teeth are in a certain way "similar", the height and width graduation carried out in the manner of groups produces a clearing of the cut channel in individual chips at the individual teeth. The number of teeth per group should be at least three, preferably four and more teeth. Consequently, the sequence of teeth in the group is not so much aimed at providing a leading tooth and following teeth, instead the individual teeth in the group are to be viewed as equivalent with regard to the cutting work to be performed, in such a way that all the teeth are also loaded approximately in the same way. The dividing of the effective cutting edge sections between the individual cutting edges does not serve so much for clearing thinnest possible chips, instead the greater number of teeth in the group of teeth suggests the opposite, namely clearing chips of comparatively increased thickness, so that wear on the effective cutting edge does not have such adverse effects as in the case of extremely thin chips. It is particularly important that on all the teeth the effective cutting edge is in each case formed by a jutting-out cutting edge—in contrast to a continuously effective cutting edge in a straight line—so that each chip cleared by the effective part of a cutting edge is subjected to a deformation acting on it in two different directions during clearing, and consequently brings about a chip-breaking effect. The provision of phases on all the teeth in symmetrical arrangement with respect to the longitudinal center axis also serves, in addition, for stabilizing the straight running of the saw blade. Here a stabilizing wedge effect is achieved by uniform supporting of the teeth in the cut channel in such a way that there is no tooth on which a resulting lateral force is exerted. Lateral forces are admittedly generated on all the teeth. However, due to the symmetrical design of the phases, the two lateral forces on each tooth cancel each other out, since these forces are directed oppositely to each other. On the one hand, consequently, lateral forces are deliberately induced and utilized for stabilizing straight running. On the other hand, these lateral forces are always generated in such a way that they cancel each other out with regard to a lateral force component which could be the cause for the blade or band to run sideways. The jutting-out of the effective cutting edge also acts as a chip breaker and subdivides the cut channel face to be cleared into individual, strip-shaped faces, the number of which is twice the number of teeth in the group. Of particular significance, furthermore, is the provision of an angle greater than 90°, preferably even greater than 100°, between phase and flank, at least on the widest tooth in the group of teeth. In the final analysis, it is this outer edge which works the side wall of the cut channel and determines the surface quality. Since here the angle between flank and phase is formed in particular so as to be appreciably greater than 90°, unavoidable wear occurring here too on the widest tooth of the group of teeth has less adverse effects than in the case of an acute-angled configuration. With increasing wear, the cut channel is constricted comparatively less and consequently longer service lives are obtained, an altogether surprising effect. In addition, the obtuse-angled geometry brings about a greater stability against breaking out of the cutting-edge corners, which is of particular importance especially when hard cutting materials are used.

It should be pointed out that the invention can be realized first of all when applying a constant pitch. Already when this is so, the height graduation and the width graduation of the teeth in the group produce reduced sensitivity to vibrations and outstanding straight running of the stabilized band in spite of the similarity in the shaping of the teeth. However, what is of particular significance, and the invention readily allows, is to use the described design also in combination with a variable pitch. If this happens, a distinction can or must be drawn between equal or else different numbers of teeth in each group. A first type of group is in this case characterized by the height and width graduation. A second group may be differentiated by the number of teeth recurring with regard to pitch in the case of variable pitch. The number of teeth in these two groups may be smaller, equal or greater with respect to each other. If the number of pitches in the pitch group does not coincide with the number of teeth in the group fixed by the height and width graduation, there are advantageously obtained very great numbers of teeth with regard to the recurring cycle of teeth on the saw blade. If, with regard to the height graduation (and the width graduation), the number of teeth in the group of teeth thus defined is, for example, four and the number of teeth up to a recurring pitch within a variable pitch sequence is, for example, nine, the cycle of teeth has 36 teeth, i.e. it is not until the 37th tooth in the cycle that there is a recurrence of the first tooth in the cycle.

The length of the effective cutting edges on all the teeth should be approximately equal. Consequently, in conjunction with a uniform height graduation of the teeth in the group, an approximately uniform loading of each tooth is achieved. Consequently, in conjunction with a number of teeth in the group which is at least three, but preferably four and more, in contrast to the prior art, the invention does not aim at removing the thinnest possible chips, but chips of comparatively greater thickness from the material, which are additionally divided up by the respectively jutting-out effective cutting edge. The absolute length of the effective cutting edge may be approximately equal on all the teeth. It is also possible, however, to arrange the shaping in such a way that, in the projection of the portions of the effective cutting edges, faces of always the same width are cleared in the cut channel.

The phases on all the teeth may be arranged at an equal phase angle with respect to a straight line perpendicular to the longitudinal center plane of the basic body. Consequently, these phases run parallel to each other, to be precise respectively on the left-hand side and right-hand side of the tooth, on account of the symmetrical design with respect to the longitudinal center plane through the basic body. With uniform height graduation, a uniform distance from phase to phase is obtained in the projection if the point at which the cutting edge juts out is chosen correspondingly. If the effective face portions are observed, the design can be arranged such that identical face portions are distributed over all the teeth. It is also possible, however, to provide different distances between the phases even while maintaining the same phase angles in the projection. On the other hand, the phase angles do not necessarily have to coincide. The number of points of inflection in an effective, jutting-out cutting edge section may also be greater than 1. If this number is infinitely great, an actual flank angle can no longer be established and rounded-off effective cutting edge sections are obtained.

In particular, the length of the part of the effective, jutting cutting edge formed by the phase may be greater than or approximately equal to the part of the effective cutting edge running approximately perpendicularly with respect to the longitudinal center plane. Consequently, the width of the material cleared by an effective jutting-out cutting edge is fixed, to be precise with regard to its different inflection points.

It has proved to be particularly expedient if the phases are provided at a phase angle in the range between 20° and 60°—preferably approximately 45°. Consequently, the wedging support of each tooth, important for stabilizing straight running, is provided on the base of the cut channel. The phase angle must not be chosen to be too small, in order for an appreciable stabilizing effect to occur. On the other hand, the phase angle must not be chosen to be too great, in order for a clamping effect of the saw blade in the cut channel to be avoided. A phase angle of the order of magnitude of 45° has proved to be particularly suitable in this case. The phase angle at the same time determines the angle by which the two portions of each cleared chip are reciprocally acted upon by forces.

The flanks of all the teeth may be provided at a flank angle in the range between 3° and 12°, in particular 8°. A small flank angle in conjunction with a large phase angle produces a very stable design of the free corners of the respective tooth, which are consequently obtuse-angled and prove to be less prone to wear. It goes without saying that only the two corners of the widest tooth, that is of the last tooth in the group of teeth of the width graduation, performs cutting work. The flank angles of the individual teeth in the group of teeth may well be chosen to be different, the flank angle of the widest tooth being of particular significance. In this case, the widest tooth must be wider than the width of the basic body of the saw blade.

It is also possible, however, that the flanks of all the teeth are provided at a coinciding flank angle with congruent projection. This simplifies production considerably in that the flanks of all the teeth can be worked with a constant machine setting, for example by grinding.

The cutting edges may be provided on carbide-tipped, ground teeth and all the teeth may in this case have a greater width than the basic body. In conjunction with the phase angle, a width graduation then also occurs. The teeth are consequently formed with a large surface area overall and can consequently be loaded fully. Generally, the teeth or major parts thereof are produced by carbide tipping and by grinding. Beforehand, the band strip of the basic body is correspondingly prepared by a milling operation. It is also possible, however, to use a rolled bimetal strip, conically widened on one side, as material and to form the teeth or cutting edges by a combined milling/grinding operation.

The teeth in the groups of teeth may have a linear height and width graduation. This contributes to the uniform loading of the teeth.

Groups which have recurring, variable pitches may be formed in the recurring cycle of teeth. In this case, the number of teeth in the pitch group does not necessarily have to coincide with the number of teeth in the width/height group. In the case of a pitch group with five pitches and a height group with four different heights, the number of teeth in the cycle is 20. The number of teeth in the cycle is obtained as the smallest common multiple of the number of teeth in the two groups. Due to this high number of teeth in the cycle, the saw blade is comparatively insensitive to excitations of vibrations. It has greater running smoothness with stabilized straight running and the service lives are surprisingly improved in comparison with conventional saw blades.

BRIEF DESCRIPTION OF THE DRAWINGS

The invention is further explained and described with reference to a number of illustrative embodiments. In the drawings:

FIG. 1 shows a side view of a cutout from a saw blade in enlarged representation, FIG. 2 shows a plan view of the saw blade according to FIG. 1, FIG. 3 shows a view in the direction of the line III—III in FIG. 1 of a band saw blade with four teeth in the group, FIG. 4 shows a similar representation to FIG. 3, but of a second illustrative embodiment of a band saw blade.

DETAILED DESCRIPTION

Figure 6:
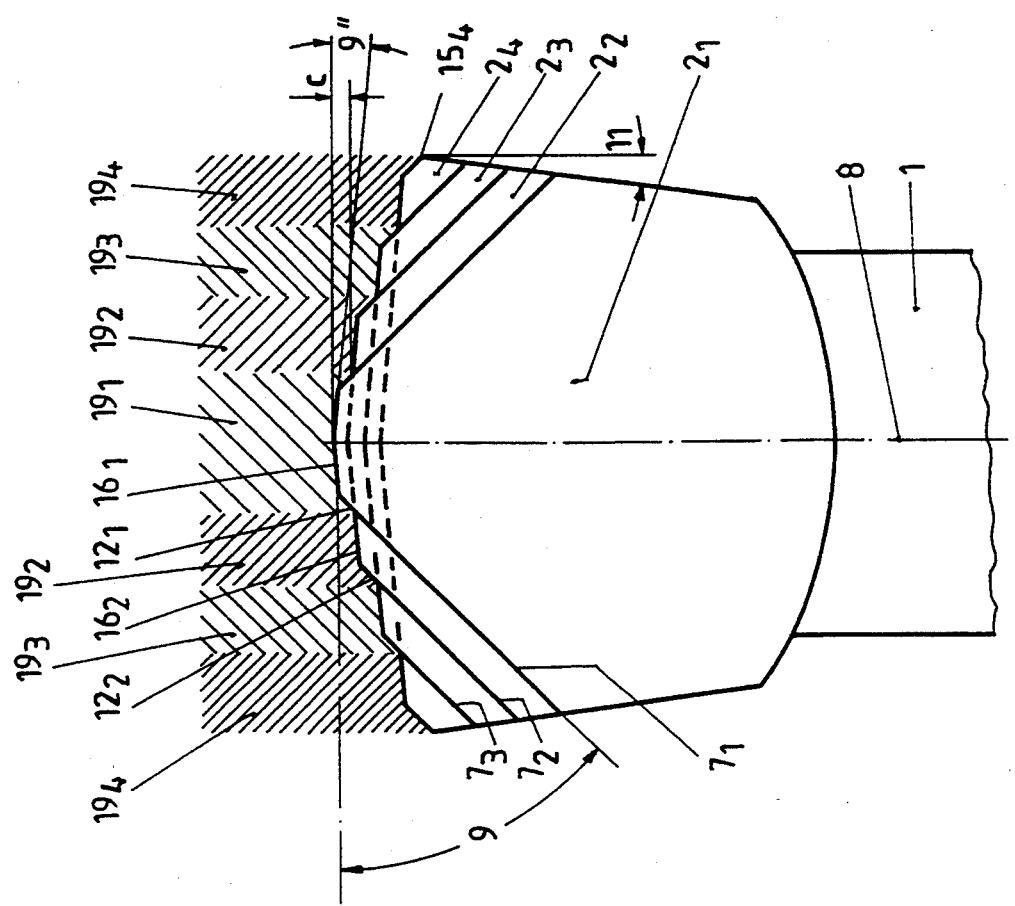
FIG. 6 shows a similar representation to FIG. 3, but of a fourth illustrative embodiment

The band saw blade illustrated in FIG. 1 in a cutout has a basic body 1 with unset teeth 2, which are provided in recurring cycles. Each cycle comprises a number of teeth, it being intended first of all to assume for the sake of simplicity that the number of teeth per cycle and the number of teeth per group is to coincide, as is the case with constant pitch. The first tooth $2_1$ of such a group or of such a cycle is identified by the index 1, whereas the last tooth of such a group or of such a cycle is identified by the index n. The number of teeth per group or cycle is at least three, preferably four and more. Each tooth has a height 3, here too the indexing described having been carried out again. The teeth 2 in the group have a height graduation such that the height decreases from tooth to tooth. The height $3_1$ of the first tooth is consequently greater than the height of the second, following tooth, the height of the second tooth is in turn greater than the height of the third tooth etc. The last tooth in the group consequently has the smallest height $3_n$. The teeth 2 also have different widths 4, here too a width graduation being provided such that the first tooth $2_1$ has the smallest width, the last tooth $2_n$ in a group the greatest width. Each tooth 2 has a or protruding cutting edge 5, which is formed by an inner section 6 and, in each case, an outwardly adjoining phase 7. Here, the section 6 runs perpendicularly, transversely with respect to a longitudinal center plane 8, through the basic body 1. The design of each tooth 2 is designed symmetrically with respect to the longitudinal center plane 8, so that the phases 7 are provided symmetrically to the right and left on each tooth. As illustrated in FIGS. 3 to 6, the phases 7 are arranged to be inclined toward the basic body 1. This produces a phase angle 9 which should be provided in the range between 20° and 60°—preferably approximately 45°. The phase angle 9 is the angle between a direction perpendicular to the longitudinal center plane 8 and the phase 7. The phases 7 are made on the individual teeth 2 in such a way that the phase of the first and highest tooth has only a comparatively small section $6_1$, which has a smaller length than the thickness of the basic body, whereas on the last tooth of a group of teeth the straight section $6_n$ has a greater dimension than corresponds to the width of the basic body 1.

The different shaping of the teeth can be seen most easily from FIG. 3, in which an illustrative embodiment with four teeth 2 in the group is represented. First of all, the highest tooth $2_1$ can be seen in plan view with its straight, relatively small configured section $6_1$, which here has the length $a_1$. This straight section $6_1$ is adjoined at the first tooth $2_1$ by the relatively long-formed phases $7_1$, which are provided at the phase angle 9, here 45°. The phase $7_1$ extends up to the flank $10_1$ of the tooth $2_1$. The flank 10 widens from the basic body 1 in the direction of the tip of each tooth 2. The flank 10 is arranged here at a flank angle 11, which in this example is 8°. The flank angle 11 is not indexed, since the flanks 10 of all the teeth coincide in the projection, that is all the flanks 10 are provided at the same flank angle 11. The forming of the flanks 10 is performed by a grinding operation over all the teeth 2 of the group. However, the first tooth $2_1$ cuts only with part of its cutting edge $5_1$, to be precise with the part which jams one or projects beyond the outline of the second tooth $2_2$ in the projection. The effective, cutting part of the cutting edge $5_1$ of the first tooth $2_1$ comprises the straight section $6_1$ and the adjoining section $12_1$ on both sides. The sections $12_1$ end at the projection intersection 13.

The second-highest tooth $2_2$ has a straight section $6_2$ of the length $a_2$, to which in turn phases $7_2$ adjoin on both sides in a symmetrical way. The line followed by all the phases 7 on all the teeth 2 is parallel to one another. Tooth $2_2$ has an effective cutting edge as well, because only a certain part of the cutting edge $S_2$ cuts, namely the part of the cutting edge $5_2$ which projects beyond the outlines of the other teeth. These are the two cutting-edge sections $14_2$ of the section $6_2$ which run perpendicularly with respect to the longitudinal center plane 8 and the two respectively adjoining sections $12_2$ of the phases $7_2$. The same applies correspondingly for the third tooth $2_3$ and the fourth tooth $2_4$, which represents the last tooth in the group of teeth. In the case of the last tooth $2_4$, the phases $7_4$ are identical to the sections $12_4$. If the flanks 10 are extended in the direction of a line which represents the extension of the section $6_1$, a theoretical width b of the tooth $2_n$ or $2_4$ is obtained here.

It can be seen from FIG. 3 that only the two outer corners $15_4$ of the last tooth $2_4$ cut, whereas the corners $15_1$, $15_2$ etc. move within the cut channel and are not involved in material removal. For the service life and unavoidable wear on the corners $15_4$ it is important to appreciate that the angle between the phase $7_4$ and the flank $10_4$ is not formed so as to be acute-angled, but obtuse-angled, that is greater, preferably appreciably greater, than 90°.

The uniform height graduation can be seen from FIG. 3. Thus, the difference c between the heights of neighboring teeth is $$C = 0.035 \times B.$$

With a width b of 1.8 mm, 0.063 mm is obtained for the difference c. The height and width graduation is thus chosen in conjunction with the phase angle 9 such that strip-shaped portions, illustrated in, FIG. 6 are cleared out of the workpiece by each tooth of the group of teeth, the width of the strips per tooth approximately coinciding, in order that each tooth 2 of the group is loaded approximately uniformly. Each individual chip which is cleared by a tooth of the group of teeth is bent as it were in two directions, which are different, in the region of the inflection point $17_1$ of the cutting edge between the first section $6_1$ and the effective part of the phase $7_1$. This contributes to splitting up the individual chip further as it were or breaking it down into parts during removal.

A second illustrative embodiment is illustrated in FIG. 4. This embodiment is configured similarly to that of FIG. 3. Here, however, the phase angle 9 is 30°. The embodiment of FIG. 6 also has four teeth 2 provided in the group. It is, furthermore, assumed that a constant pitch is applied, so that the number of teeth in the cycle is also four. The height graduation and the width graduation are carried out uniformly.

Figure 5:
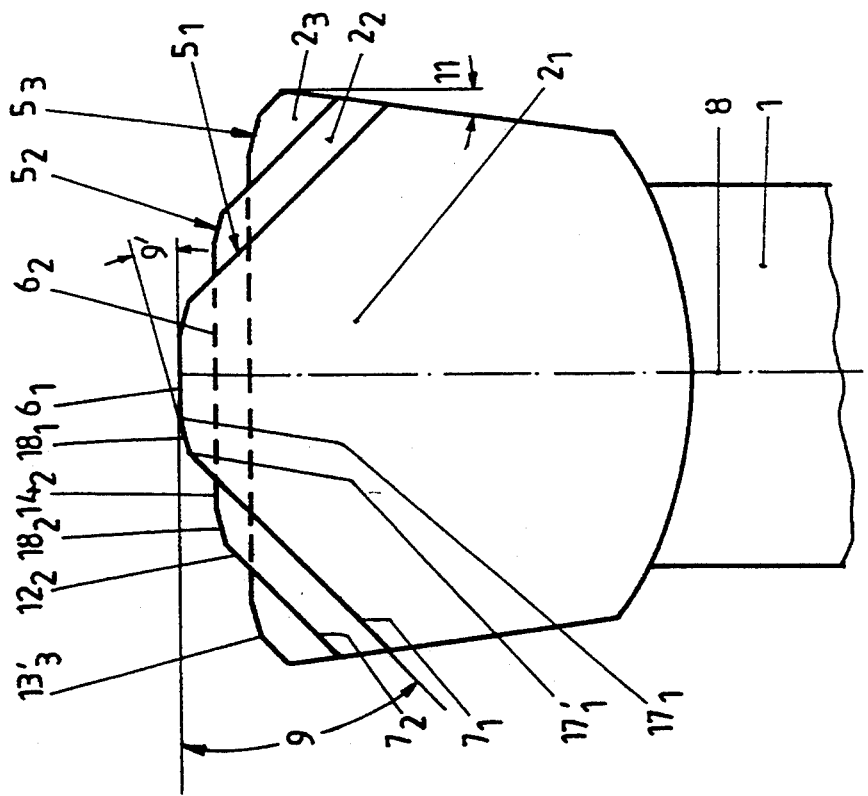
FIG. 5 shows a similar representation to FIG. 3, but of a third illustrative embodiment.

FIG. 5 shows a third further embodiment, in which only three teeth 2 are provided in the group. The phase angle 9 is 45° and the flank angle 11 is chosen to be 8°. Here, however, the cutting edges 5 are not composed of two straight-running sections, but of three straight-running sections, that is with two inflection points $17_1$ and $17'_1$. For the first and consequently highest tooth $2_1$ there is obtained a straight section $6_1$, which is adjoined at a phase angle $9'$ by a first phase section $18_1$ and then a second phase $7_1$. The phase $7_1$ is provided at the phase angle 9. The second tooth $2_2$ has a straight cutting-edge section $14_2$, a first phase section $18_2$ and a second phase $7_2$. It can be seen that the entire phase section $18_2$ lies in the region of the effective part of the cutting edge of the tooth $2_2$, whereas again only section $12_2$ of the phase $7_2$ is effective in a cutting manner. The third tooth $2_3$ is also formed and provided in the way described. It can consequently be seen that the cutting edges 5 on each tooth can be changed in their form by increasing the number of inflection points 17, so that, with an infinite number of inflection points, ultimately no jutting-out or protruding cutting edge but a rounded-off cutting edge is produced on each tooth. In general, however, it suffices to provide a single inflection point 17 or, at most, two inflection points, as explained with reference to FIGS. 3 and 4 on the one hand and FIG. 5 on the other hand.

FIG. 6 shows a fourth illustrative embodiment, which may essentially coincide with the previously described illustrative embodiments. Here, the number of teeth 2 in the group is again four. However, there are no straight sections 6, i.e. running perpendicularly with respect to the longitudinal center plane 8, but instead sections 16 slanted slightly in arrow form by an angle 9'' are provided. The strips $19_1$, $19_2$, $19_3$ and $19_4$ cleared by each tooth in the cut channel are indicated by hatching.

Figure 7:
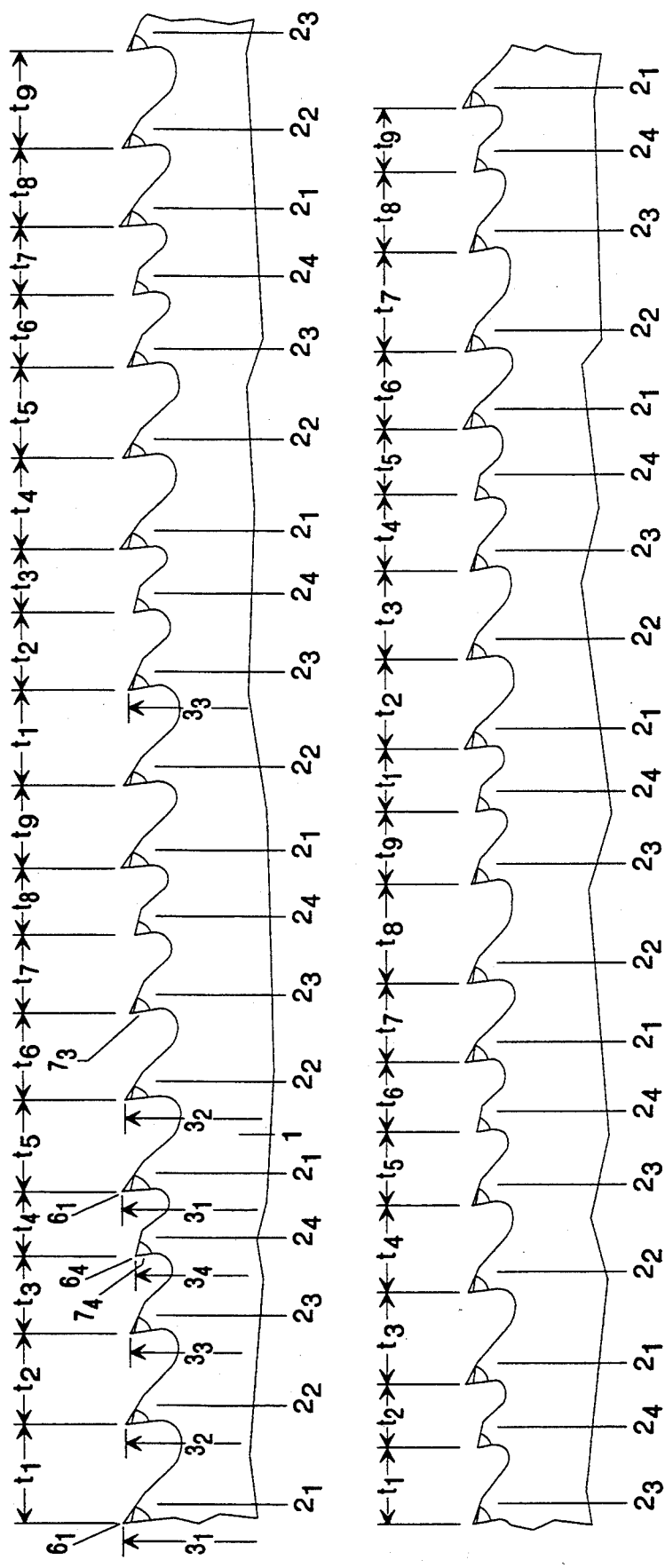
FIG. 7 shows a side view of a band saw blade with variable pitch cycle.

FIG. 7 illustrates the superposing of the height and width graduation with a variable pitch. For simplified illustration, let it again be assumed here as well that, with regard to the height graduation, there are groups of teeth of four teeth each which recur in the specified sequence and are provided thus. The number of teeth in the group sharing any one fixed height is thus four. At the same time, a variable pitch with nine pitches $t_1 \ldots t_9$ is represented, so that in a group of teeth determined by the pitch t the number of teeth in such a pitch group is nine. The form of the teeth with regard to the making of the cutting edges 5, the sections 6 and the phases 7 is precisely the same here as described with reference to the preceding illustrative embodiments. Consequently, however, a cycle of recurring teeth which corresponds to the smallest common multiple, that is $4 \times 9 = 36$, is produced. The cycle has 36 teeth. Not until the 37th tooth is there correspondence with the first tooth with regard to its design, its height and its assigned pitch. For illustration, purposes the pitches and the heights of the individual teeth are specified in the following table:

| n (tooth number) | 1 | 2 | 3 | 4 | 5 | 6 | 7 | 8 | 9 |
|---|---|---|---|---|---|---|---|---|---|
| t (pitch) | 12.70 | 11.65 | 9.50 | 8.45 | 12.15 | 11.10 | 10.00 | 8.90 | 10.45 |
| 3 (height) | 34 | 34-c | 34-2c | 34-3c | 34 | 34-c | 34-2c | 34-3c | 34. |

List of reference numerals:
1 = Basic body
2 = Tooth
3 = Height
4 = Width
5 = Cutting edge
6 = Section
7 = Phase
8 = Longitudinal center plane
9 = Phase angle
10 = Flank
11 = Flank angle
12 = Section
13 = Projection intersection
14 = Cutting-edge section
15 = Corner
16 = Section
17 = Inflection point
18 = Phase section
19 = Strip While preferred embodiments of the invention have been disclosed herein, it will be obvious to those skilled in the art that variations and modifications thereof can be made without departing from the spirit and scope of the invention, as set forth in the following claims.

We claim:

1. A saw blade, comprising:
   a basic body (1) lying in a longitudinal center plane (8) and having an edge and including along its edge a series of spaced unset teeth (2), all of said teeth being formed symmetrically with respect to the longitudinal center plane of the basic body of the saw blade;

at least some of said teeth each including a cutting edge (5) having an inner section (6) which extends approximately at a right angle with respect to the longitudinal center plane of the basic body of the saw blade and adjoining phases (7) intersecting said inner section to the right and left of each inner section and inclined from said inner section to form phase angles (9) with respect to the cutting edge (5), and flanks (10) intersecting said phases on opposite sides of said longitudinal center plane each of which extends from a phase toward the basic body;

said teeth being of different heights and widths progressively from tooth to tooth in recurring groups of at least three teeth wherein the height of the teeth in each group decreases from tooth-to-tooth, while the width of each inner section for each tooth in the same group of teeth simultaneously increases from tooth-to-tooth, so that each tooth has an effective cutting edge formed along said inner section (6) and its adjoining phases (7) which protrudes a different distance from the longitudinal center plane with respect to the adjacent teeth in the group of teeth; and wherein the widest tooth in each group of teeth has an angle greater than 90 degrees between its phase (7) and its flank (10).

2. The saw blade of claim 1, wherein said effective cutting edge further comprises that portion of the cutting edge which protrudes a different distance from the longitudinal center plane beyond the cutting edges of the adjacent teeth, and wherein the lengths of all of said said effective cutting edges is approximately equal.

3. The saw blade of claim 2, wherein said effective cutting edge further comprises that portion of the inner section and phases of said cutting edge which protrude beyond the cutting edges of said other teeth, and wherein that portion of the effective cutting edge which comprises the phases is at least as long as said inner section of the effective cutting edge.

4. The saw blade of claim 1, wherein each of said teeth further comprises a phase angle formed where each phase connects to said flanks, and where each of said phases for each of said teeth have equal phase angles with respect to a straight line perpendicular to said center plane.

5. The saw blade of claim 4, wherein said phase angle for each of said teeth is in the range between 20° and 60°.

6. The saw blade of claim 5, wherein said phase angle is 45°.

7. The saw blade of claim 1, wherein each of said teeth further comprises a flank angle formed between the flanks of each of said teeth and a line parallel to said center plane, and wherein said flank angles of said teeth are in the range of between 3° and 12°.

8. The saw blade of claim 7, wherein each of said flank angles of said teeth are identical, and wherein each of said flanks on each side of each tooth lie along a common plane extending to and intersecting a common line perpendicular to said saw blade body.

9. The saw blade of claim 8, wherein said flank angle is 8°.

10. The saw blade of claim 1, wherein each of said cutting edges further comprises a carbide tipped cutting edge.

11. The saw blade of claim 1, wherein each of said teeth are ground and are wider than said saw blade body.

12. The saw blade of claim 1, wherein each of said teeth in said group of said teeth linearly decrease in height, and linearly increase in width, from said first tooth to said last tooth.

13. The saw blade of claim 1, wherein said group of teeth has a recurring variable tooth pitch which reoccurs in said recurring cycle.

* * * * *